US009710397B2

(12) United States Patent
Macko et al.

(10) Patent No.: US 9,710,397 B2
(45) Date of Patent: *Jul. 18, 2017

(54) DATA MIGRATION FOR COMPOSITE NON-VOLATILE STORAGE DEVICE

(75) Inventors: Peter Macko, Liptovský Mikuláš (SK); Wenguang Wang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/605,921

(22) Filed: Sep. 6, 2012

(65) Prior Publication Data

US 2013/0219117 A1 Aug. 22, 2013

Related U.S. Application Data

(60) Provisional application No. 61/599,930, filed on Feb. 16, 2012, provisional application No. 61/599,927, filed on Feb. 16, 2012.

(51) Int. Cl.
*G06F 12/123* (2016.01)
*G06F 3/06* (2006.01)

(52) U.S. Cl.
CPC ............ *G06F 12/123* (2013.01); *G06F 3/068* (2013.01); *G06F 3/0611* (2013.01); *G06F 3/0656* (2013.01); *G06F 2212/217* (2013.01)

(58) Field of Classification Search
CPC ...... G06F 3/0611; G06F 3/0656; G06F 3/068; G06F 12/123; G06F 12/127; G06F 2212/217

See application file for complete search history.

(56) References Cited

U.S. PATENT DOCUMENTS

| 4,132,989 A | 1/1979 | Frosch et al. |
| 4,292,634 A | 9/1981 | Frosch et al. |

(Continued)

FOREIGN PATENT DOCUMENTS

| JP | 2008-027444 | 2/2008 |
| WO | WO-2007/031696 | 3/2007 |

(Continued)

OTHER PUBLICATIONS

PCT International Search Report and Written Opinion for corresponding International Application No. PCT/US2013/025224, mailing date Jul. 15, 2013, 8 pages.

(Continued)

*Primary Examiner* — David X Yi
*Assistant Examiner* — Zubair Ahmed
(74) *Attorney, Agent, or Firm* — Blakely, Sokoloff, Taylor & Zafman LLP

(57) ABSTRACT

Approaches to managing a composite, non-volatile data storage device are described. In one embodiment, a method for managing a composite storage device made up of fast non-volatile storage, such as a solid state device, and slower non-volatile storage, such as a traditional magnetic hard drive, can include maintaining a first data structure, which stores instances of recent access to each unit in a set of units in the fast non-volatile storage device, such as the SSD device and also maintaining a second data structure that indicates whether or not units in the slower storage device, such as the HDD, have been accessed at least a predetermined number of times. In one embodiment, the second data structure can be a queue of Bloom filters.

31 Claims, 8 Drawing Sheets

(56) References Cited

U.S. PATENT DOCUMENTS

| | | | |
|---|---|---|---|
| 5,059,318 A | 10/1991 | Benesi | |
| 6,266,771 B1* | 7/2001 | Bellare et al. | 713/176 |
| 6,598,134 B2 | 7/2003 | Ofek et al. | |
| 6,631,017 B2 | 10/2003 | Khoury | |
| 6,804,763 B1 | 10/2004 | Stockdale et al. | |
| 6,978,259 B1 | 12/2005 | Anderson et al. | |
| 7,103,740 B1 | 9/2006 | Colgrove et al. | |
| 7,548,928 B1* | 6/2009 | Dean et al. | |
| 7,555,575 B2 | 6/2009 | Kaneda | |
| 7,590,671 B2 | 9/2009 | Achiwa | |
| 7,788,220 B1 | 8/2010 | Auchmoody et al. | |
| 7,908,236 B2* | 3/2011 | Modha et al. | 706/44 |
| 7,953,953 B2* | 5/2011 | In et al. | 711/208 |
| 7,979,631 B2* | 7/2011 | Ahn et al. | 711/113 |
| 8,010,747 B2* | 8/2011 | van Riel | 711/133 |
| 8,301,650 B1* | 10/2012 | Oliver | G06F 17/30492 707/758 |
| 8,583,966 B2 | 11/2013 | Gadsing | |
| 8,732,424 B2 | 5/2014 | Lee et al. | |
| 8,745,523 B2 | 6/2014 | McInerney et al. | |
| 2001/0014886 A1 | 8/2001 | Ross et al. | |
| 2001/0051937 A1 | 12/2001 | Ross et al. | |
| 2002/0013887 A1* | 1/2002 | Ting | G06F 12/121 711/160 |
| 2003/0005223 A1 | 1/2003 | Coulson et al. | |
| 2003/0056058 A1 | 3/2003 | Veitch | |
| 2004/0044861 A1 | 3/2004 | Cavallo et al. | |
| 2004/0049553 A1 | 3/2004 | Iwamura et al. | |
| 2005/0055511 A1* | 3/2005 | Schreter | G06F 12/123 711/134 |
| 2006/0069876 A1* | 3/2006 | Bansal | G06F 12/121 711/134 |
| 2006/0195508 A1 | 8/2006 | Bernardin et al. | |
| 2006/0294311 A1* | 12/2006 | Fu et al. | 711/118 |
| 2007/0078827 A1* | 4/2007 | Sareen | G06F 17/30687 |
| 2007/0124560 A1 | 5/2007 | Van Riel | |
| 2007/0168398 A1 | 7/2007 | Miroshnichenko et al. | |
| 2007/0168627 A1* | 7/2007 | In | G06F 12/12 711/159 |
| 2007/0220200 A1* | 9/2007 | Gill | G06F 12/123 711/113 |
| 2008/0021853 A1* | 1/2008 | Modha et al. | 706/44 |
| 2008/0154852 A1* | 6/2008 | Beyer | G06F 12/0864 |
| 2008/0256094 A1* | 10/2008 | Gupta | G06F 17/30949 |
| 2008/0313132 A1* | 12/2008 | Hao | H04L 45/00 |
| 2010/0082936 A1 | 4/2010 | Hobbet et al. | |
| 2010/0191899 A1* | 7/2010 | Kurashige et al. | 711/103 |
| 2010/0332725 A1 | 12/2010 | Post et al. | |
| 2010/0332730 A1 | 12/2010 | Royer et al. | |
| 2011/0022601 A1 | 1/2011 | Elrom et al. | |
| 2011/0082967 A1 | 4/2011 | Deshkar et al. | |
| 2011/0138112 A1 | 6/2011 | Chiang et al. | |
| 2011/0145489 A1* | 6/2011 | Yu et al. | 711/103 |
| 2011/0179219 A1 | 7/2011 | Ma et al. | |
| 2011/0191522 A1* | 8/2011 | Condict | G06F 12/123 711/103 |
| 2011/0231362 A1 | 9/2011 | Attarde et al. | |
| 2011/0276744 A1* | 11/2011 | Sengupta | G06F 12/0866 711/103 |
| 2011/0276781 A1 | 11/2011 | Sengupta et al. | |
| 2011/0283045 A1 | 11/2011 | Krishnan et al. | |
| 2011/0307447 A1 | 12/2011 | Sabaa et al. | |
| 2011/0320754 A1 | 12/2011 | Ichikawa et al. | |
| 2012/0017043 A1 | 1/2012 | Aizman et al. | |
| 2012/0059972 A1* | 3/2012 | Chen | G06F 12/0246 711/4 |
| 2012/0066389 A1 | 3/2012 | Hegde et al. | |
| 2012/0084523 A1 | 4/2012 | Littlefield et al. | |
| 2012/0101995 A1 | 4/2012 | Agetsuma et al. | |
| 2012/0137066 A1 | 5/2012 | Nolterieke et al. | |
| 2012/0239859 A1 | 9/2012 | Lary et al. | |
| 2012/0278662 A1 | 11/2012 | Gadsing | |
| 2013/0031298 A1 | 1/2013 | Tan et al. | |
| 2013/0042052 A1 | 2/2013 | Colgrove et al. | |
| 2013/0063307 A1 | 3/2013 | Krasner et al. | |
| 2013/0218892 A1* | 8/2013 | Bell et al. | 707/736 |
| 2013/0218901 A1 | 8/2013 | Majnemer et al. | |
| 2013/0219139 A1 | 8/2013 | Wang et al. | |

FOREIGN PATENT DOCUMENTS

| | | |
|---|---|---|
| WO | WO 2007/031696 A1 | 3/2007 |
| WO | WO-2011/144477 | 11/2011 |
| WO | WO 2011/144477 | 11/2011 |

OTHER PUBLICATIONS

PCT International Search Report and Written Opinion for corresponding International Application No. PCT/US2013/025597, mailing date Jul. 15, 2013, 8 pages.

Jiang, Song et al., "Clock-Pro: An Effective Improvement of the Clock Replacement", In Proceedings of USENIX Annual Conference, (2005) 14 pages.

Wenisch, Thomas F., et al. "Practical off-chip meta-data for temporal memory streaming," High Performance Computer Architecture, 2009, HPCA 2009. IEEE 15th International Symposium on. IEEE, 2009.

Yi Li; Zhiyan Wang; Haizan Zeng—"Correlation filter: an accurate approach to detect and locate low contrast character strings in complex table environment"—Pattern Analysis and Machine Intelligence, IEEE Transactions on (V:26, 1:2)—Dec. 2004—pp. 1639-1644.

Siew Chin Chong, Andrew Beng Jin Teoh, David Chek Ling Ngo—"Iris Authentication Using Privatized Advanced Correlation Filter"—Advances in Biometrics—Computer Science vol. 3832, 2005, pp. 382-388.

Jiang, Song et al., CLOCK-pro: An Effective Improvement of the CLOCK Replacement:, In Proceedings of USENIX Annual Conference, (2005), 14 Pages.

Hannes Payer et al.: "Combo Drive: Optimizing Cost and Performance in a Heterogeneous Storage Device", Mar. 7, 2009.

Feng Chen et al.: "Hystor: Making the Best use of Solid State Drivers in High Performace Storage Systems", Supercomputing, ACM, 2 Penn Plaza, Suite 701 New York, NY 10121-0701, May 31, 2011, pp. 22-32, XP058003711.

PCT International Preliminary Report on Patentability for PCT/US2013/025597 dated Aug. 19, 2014.

\* cited by examiner

BLOOM FILTER DATA STRUCTURE

DATA MIGRATION FOR COMPOSITE NON-VOLATILE STORAGE DEVICE

CROSS-REFERENCE

The present application claims the benefit of provisional application Ser. No. 61/599,930, filed on Feb. 16, 2012, and this provisional application is hereby incorporated by reference. The present application is also related to application Ser. No. 61/599,927, which was also filed on Feb. 16, 2012, and which is hereby incorporated by reference.

BACKGROUND OF THE INVENTION

The present invention relates to methods for managing storage of data in a composite non-volatile memory that is a composite of a slow memory device and a fast memory device. In a composite disk system, a large, slow, and inexpensive magnetic hard drive can be combined with a small, fast but expensive storage device, such as a solid state drive to form a logical volume. This can provide the advantage of fast access through the solid state drive (SSD) while providing the large capacity of the magnetic hard disk drive (HDD). Prior techniques for managing such a composite disk have used algorithms such as a least recently used (LRU) algorithm or a CLOCK algorithm or the Clock-Pro algorithm described by Song Jiang. These prior techniques can improve the allocation of the data between the fast and the slow portions of the composite disk, but they tend to not be space efficient, in that they require large amounts of main memory, such as large amounts of DRAM, in order to implement the data structures used in these techniques for allocating data between the two parts of the composite disk. Hence there is a need for an improved, space efficient technique, which does not require as much memory to store the data structures used in allocating or migrating data between the two or more components of the composite disk.

SUMMARY OF THE DESCRIPTION

In one embodiment, a method for managing access to a fast non-volatile storage device, such as a solid state device, and a slower non-volatile storage device, such as a magnetic hard drive, can include maintaining a first data structure which indicates a recency of access to each unit in a set of units in the fast non-volatile storage device, such as the SSD device and also maintaining a second data structure that indicates whether or not units or blocks in the slower storage device, such as the HDD device, have been referenced recently (such as the units or blocks that have been referenced only once recently). In one embodiment, the second data structure can be a queue of Bloom filters with a low memory overhead. The Bloom filter queue is correct most of the time with respect to whether a unit or block in the slower storage device has been referenced recently, but is not guaranteed to always provide a correct answer.

Other features of the present invention will be apparent from the accompanying drawings and from the detailed description, which follows.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example, and not limitation, in the figures of the accompanying drawings in which like references indicate similar elements.

DETAILED DESCRIPTION

Approaches to improving the management of a composite, non-volatile data storage device are described. Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software (as instructions on a non-transitory machine-readable storage medium), or a combination of both. Although the processes are described below in terms of some sequential operations, it should be appreciated that some of the operations described may be performed in a different order. Moreover, some operations may be performed in parallel rather than sequentially.

Figure 1:
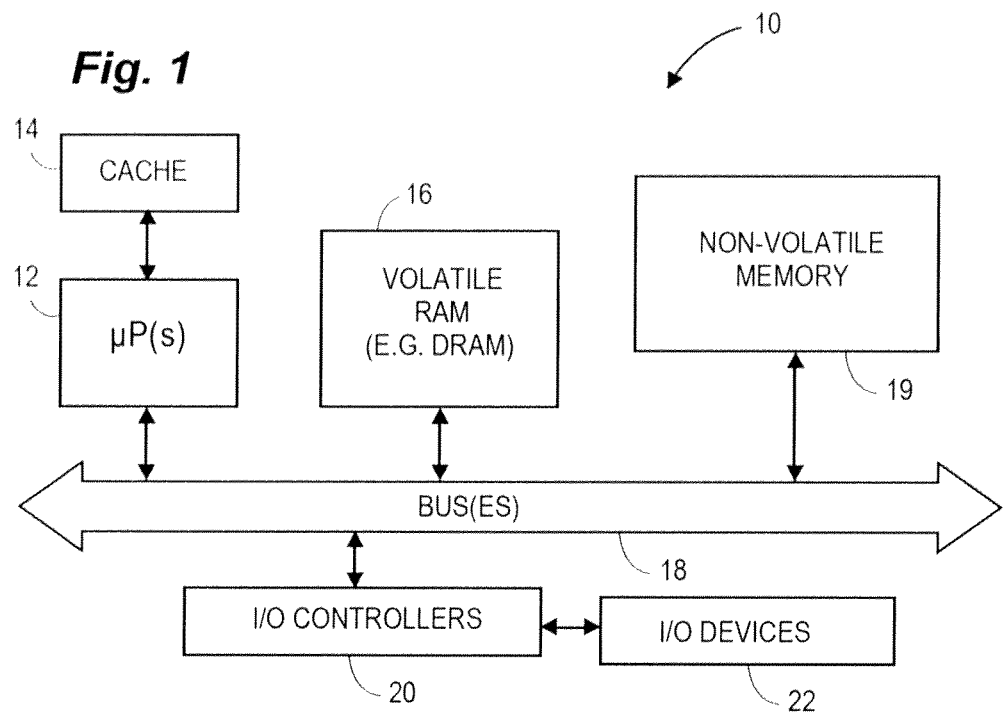
FIG. 1 shows an example of a data processing system, which may be employed with an embodiment of the present invention.

FIG. 1 shows an example of a computing system 10, which is a form of a data processing system, which can be employed with one or more embodiments described herein. The system 10 can be a desktop computer system or a laptop computer system or a Smartphone, or some other electronic devices or consumer electronic devices. The system 10 can include one or more microprocessors or other logic units 12 coupled to an optional cache 14 which in one embodiment can be SRAM, as known in the art. The one or more microprocessors 12 are coupled to the rest of the system through one or more buses 18, which couple the one or more microprocessors 12 to main memory, which can be volatile RAM 16. In one embodiment, volatile RAM can be the conventional DRAM used in computer systems, where the DRAM is coupled through the bus to the rest of the components in the system 10. The system 10 can also include one or more input/output controllers 20, which couple one or more input/output devices 22 to the rest of the system through the one or more buses 18. The system 10 also includes a non-volatile memory 19 which can be a composite disk, such as a combination of flash memory, which is a form of a solid state, drive and a conventional magnetic hard drive.

Figure 2:
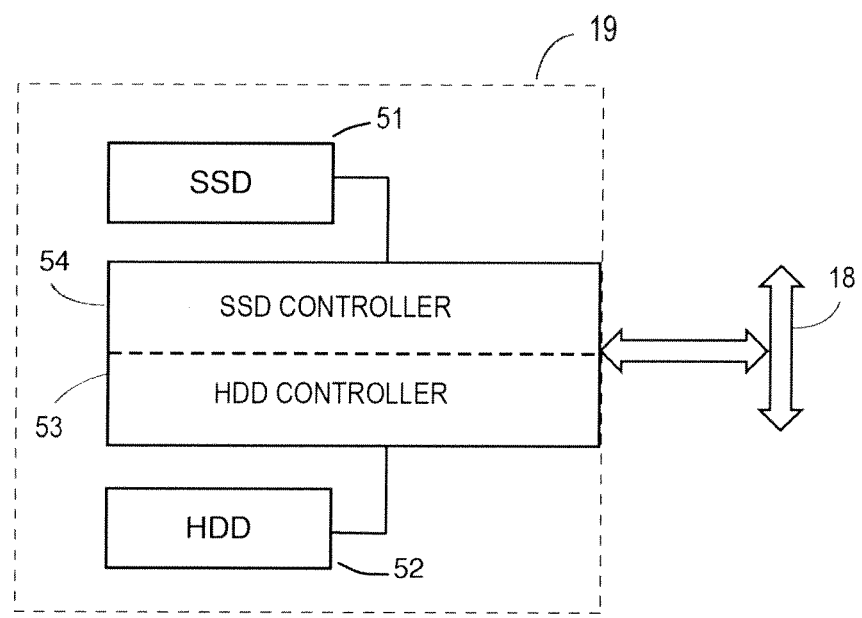
FIG. 2 shows an example of a composite non-volatile memory according to one embodiment of the present invention.

FIG. 2 shows an example of a composite disk according to one embodiment. The non-volatile memory 19 includes a solid state drive 51 and a magnetic hard drive 52 which can be treated as a single logical volume, or block device by a file system and an operating system and are controlled by one or more controllers, such as controller 54 which includes a solid state drive controller, and controller 53 which includes a hard disk drive controller. The one or more controllers couple the composite drive shown in FIG. 2 to the rest of the components in system 10 through the bus 18. It will be appreciated that flash memory is one form of a fast non-volatile storage device and that other fast storage devices can alternatively be used in conjunction with a slower storage device which can be a conventional magnetic hard drive or other non-volatile storage devices which are slower than the faster storage device. It will be understood that in this description a reference to SSD or HDD will be construed to mean the faster and the slower non-volatile storage devices and will not be construed as being limited to, or specific to any storage device technology.

Figure 3:
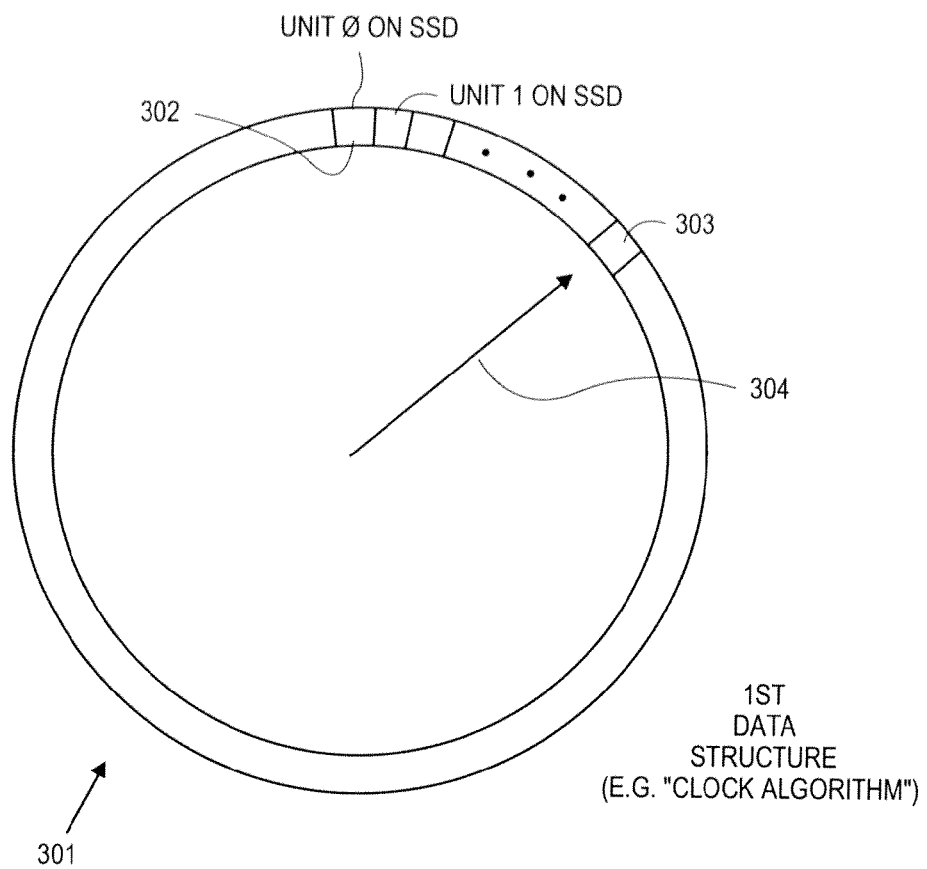
FIG. 3 shows an example of a data structure for an algorithm, which may be referred to as a clock algorithm.

FIG. 3 shows an example of a first data structure, which is used in conjunction with a clock algorithm according to one embodiment of the present invention. The clock algorithm in one embodiment can be similar to the prior clock algorithms, which are used, in the prior art. The clock algorithm can use the data structure 301 which can be a circular queue that includes a clock pointer 304, which points to a particular location in the queue based upon the clock algorithm. Each location in the circular queue corresponds to a particular unit in the fast non-volatile memory device; such as the solid state drive implemented through a flash memory system. In a sense, the first data structure is similar to a block allocation bit map maintained by a file system which indicates which blocks are free and which blocks are allocated (not free) on a hard drive.

For example, location 302 corresponds to unit zero on the SSD and the next unit to the right corresponds to unit one on the SSD, and location 303 corresponds to another unit on the SSD. Each location stores a value indicating the state of the corresponding storage unit within the SSD. In one embodiment two-bit value can be used, such that a value of zero can indicate that the one or more blocks or other components in a particular unit on the SSD is free while the value of one in a location can indicate that a particular unit on the SSD has not been referenced recently and a value of two can indicate that that unit in the SSD has been referenced recently. A value of three can indicate that a unit is pinned to the SSD, and cannot be demoted to the HDD. Alternatively, in one embodiment, a three-bit value can be used which can track the specific number of accesses to a unit. In this embodiment, a zero value can also indicate that the unit is free; a value of one can indicate that the unit has not been referenced recently, and the maximum value of seven can indicate that the unit is pinned. Other values can indicate the number of times a unit has been recently referenced, such as a value of six, which would indicate five recent references.

In one embodiment, the first data structure 301 can be managed as follows. When the algorithm needs to find a candidate to demote from the SSD to the HDD, it will use the clock pointer 304. In one embodiment, the clock pointer 304 will sweep from one unit to the next unit in a clockwise direction, until it finds a unit with value of one, which means the unit has not been referenced recently. In one embodiment, the clock pointer 304 can sweep in a counter-clockwise direction. If the value in the unit is set to the maximum value, then the unit is pinned to the SSD and cannot be demoted to the HDD. If the value is larger than one, but is not the maximum value, the value is decremented by one, down to a minimum value of one, before the clock pointer moves to the next unit. When a particular unit in the SSD is accessed, a counter in the location corresponding to that unit on the SSD can be incremented. Using this method, frequently accessed units on the SSD will attain increasingly higher counts in the unit of the data structure corresponding to that unit on the SSD, up to a preset count limit. However, as the clock pointer 304 sweeps from unit to unit each time a candidate for demotion is required, a count in each sequential unit (e.g. 302, 303) will decrement each time the clock pointer 304 passes that unit, down to a minimum value of one, which indicates that the unit has not been recently accessed. Further details in connection with the use of the clock algorithm relative to the second data structure, which will be next described, are provided in conjunction with FIGS. 5, 6, and 7.

Figure 4:
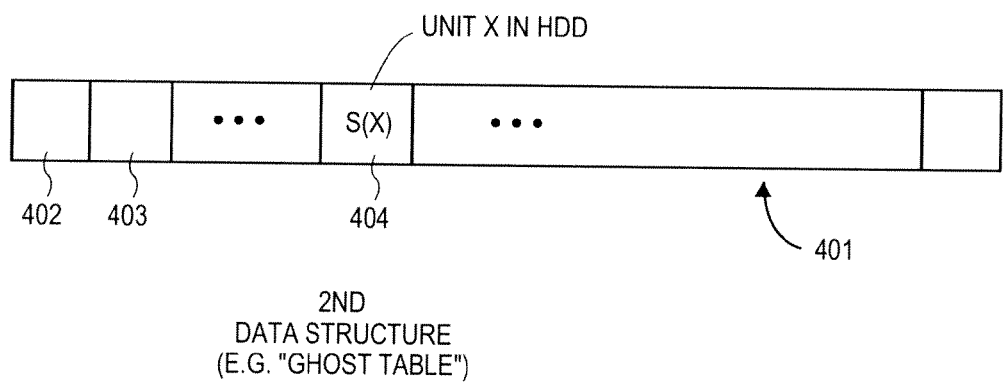
FIG. 4 shows an example of a data structure, such as a ghost table, which can be used with one or more methods described herein according to one embodiment of the present invention.

FIG. 4 shows an example of a second data structure, which can be referred to as a ghost table, which is used to keep track of accesses of units on the slower non-volatile memory, such as the HDD, for accesses that exceed more than one recent access or ore than a predetermined number of recent accesses. In one embodiment, the second data structure can be the same size in terms of the number of locations in the data structure as the number of units in the SSD or it can be proportional to the size of the number of units in SSD. In one embodiment, a signature value for a particular unit number in the HDD can be stored in each location of the second data structure. The unit, in one embodiment, can be a logical block on the magnetic hard drive from the perspective of the file system. The second data structure 401 includes three locations 402, 403, and 404 as well as other locations, and each of those locations can store a signature of a unit number in the HDD. Location 404 shows an example of a signature value for the unit X in the HDD indicating that data in that unit on the HDD has been recently accessed (through either a read or write) at least once or at least a predetermined number of times.

Figure 5:
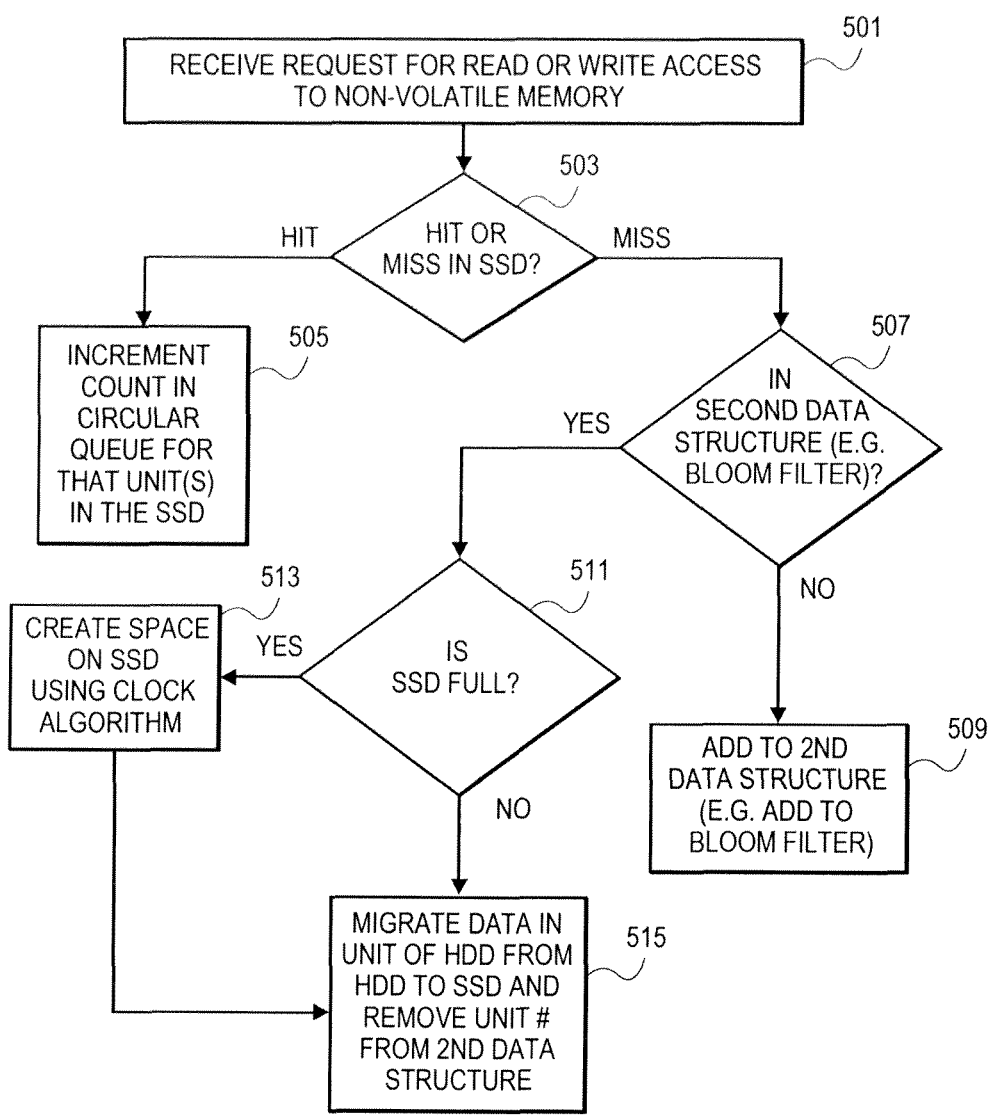
FIG. 5 is a flowchart, which depicts a method according to at least one embodiment of the present invention.
Figure 7:
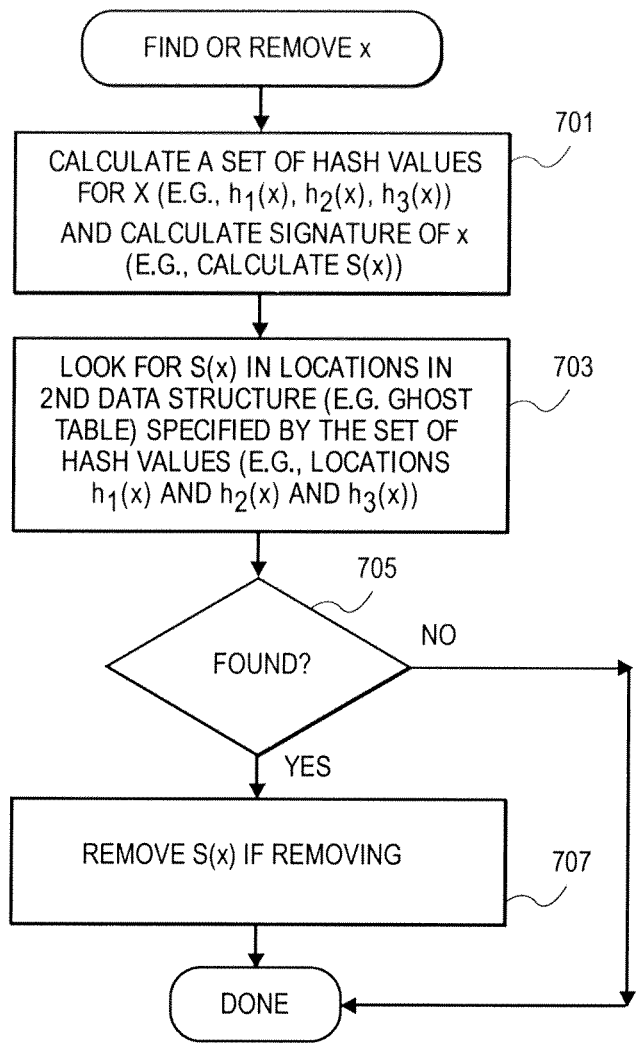
FIG. 7 is a flowchart, which depicts a method according to one embodiment of the present invention.

FIG. 5 shows an example of a method according to one embodiment of the present invention for utilizing the first data structure, such as the data structure 301 and the second data structure, such as the data structure 401 to control the migration of data between the fast storage device, such as the SSD and the slower storage device, such as the HDD. The method of FIG. 5 can begin in operation 501 in which the system receives a request for a read or write access to a non-volatile memory. In one embodiment, a file system controls the composite disk and treats the composite disk as a single logical volume. The file system or another component in the data processing system then proceeds to determine how to allocate the data between the two or more portions of the composite disk using the method shown in FIG. 5. In response to the receipt of the request for a read or write access, the method proceeds to operation 503 in which it determines whether or not the requested data is in the faster storage device. If it is in the faster storage device then there is a hit in the SSD, in which case processing proceeds to operation 505 in which the count in the circular queue, such as the data structure 301, for the unit found on the SSD, is incremented by one. This is done without moving the clock pointer 304. In this manner, the clock algorithm, through the first data structure, keeps track of the number of accesses to the units in the SSD. If operation 503 determines there is a miss in the SSD, then the system proceeds to operation 507 in which it determines whether or not the data is in a second data structure, such as the ghost table 401 shown in FIG. 4, which is in the form of a probabilistic hash table. Finding data in the second data structure is illustrated in FIG. 7, which is discussed below.

If operation 507 determines that the unit is not already in the second data structure then it proceeds to operation 509 in which the unit number or a representation of the unit number is added to the second data structure which can be the ghost table 401. Further information concerning operation 509 is provided in connection with FIG. 6 which will be described below. If in operation 507 it is determined that the unit containing the requested data is already in the second data structure, then processing proceeds from operation 507 to operation 511 in which it is determined whether or not the fast storage device is full. If it is not full, then operation 515 follows. Various conventional algorithms can be used to determine whether or not the SDD is not full and they do not need to rely upon the use of the clock algorithm or the first data structure 301.

In operation 515, data in the unit of the HDD that is being accessed is migrated from the HDD to the SDD using techniques, which are known in the art. Further, the unit number for that unit of data that has been migrated or is to be migrated is removed from the second data structure, such as the ghost table 401. If in operation 511 the system determines that the SSD is full, then operation 513 precedes operation 515. It will be appreciated that the file system will still maintain conventional data structures indicating the locations of various data in response to the migration of the data in operation 515. In operation 513, the system creates space on the SSD using, in one embodiment, the clock algorithm. In this case, the clock algorithm uses the clock pointer 304 to move sequentially through the circular queue, starting with the current position of the clock pointer to a position which indicates a unit in the SSD that has not been recently referenced; in one embodiment, this is indicated by the value of one stored in a location in the circular queue. As the clock pointer 304 is moved through the circular queue in a circular fashion, the value in each location is decremented by one. As the clock pointer 304 moves through the queue decrementing the values in each location, eventually one of the units will receive a value indicating it is an available unit. Once the clock algorithm determines a next available unit location in the SSD, then the data in that unit of the SSD can be flushed to the HDD and the accessed data on the HDD can be migrated from the HDD to that location or unit in the SSD in operation 515 which can follow operation 513. The removal of a unit number from the second data structure is further described in conjunction with FIG. 7.

Figure 6:
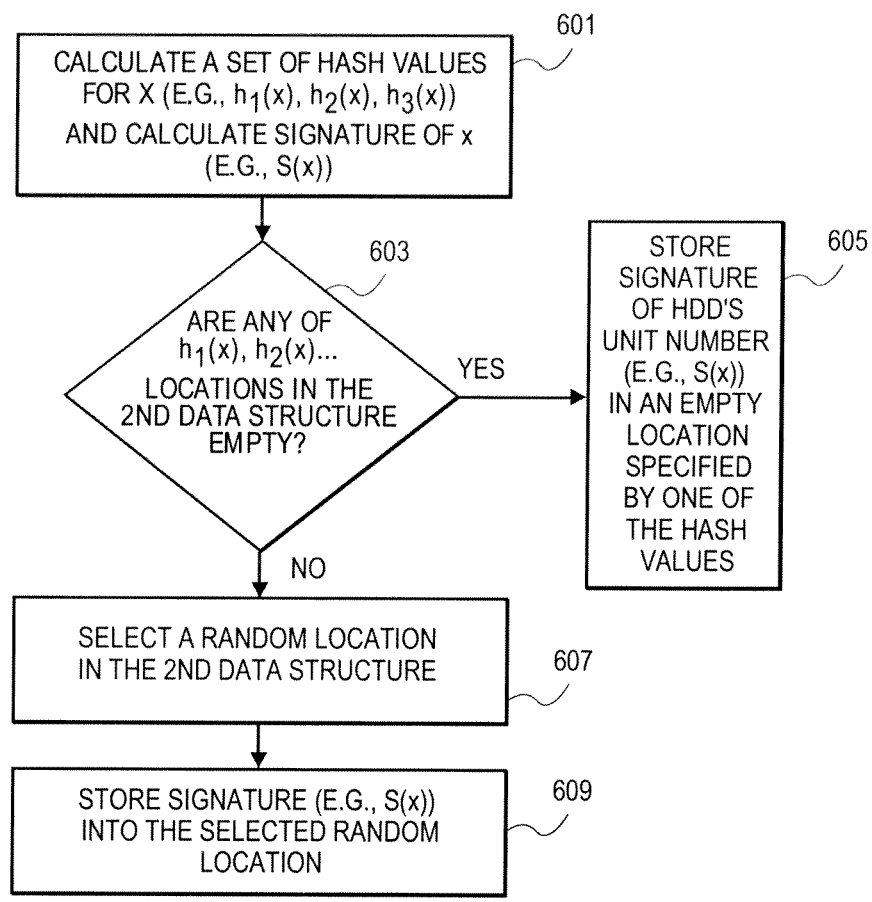
FIG. 6 is a flowchart, which depicts a method according to at least one embodiment of the present invention.

FIG. 6 shows an example of a method for adding data into the second data structure, where X can represent a unit number in the HDD, such as one or more logical blocks on a hard drive. It can be appreciated that the methods of FIGS. 6 and 7 allow for the creation of a probabilistic hash table, which can be the data structure 401 shown in FIG. 4. The probabilistic hash table may not be always correct with respect to the number of accesses of a unit on the HDD due to the fact that hashes and signatures are used in creating values stored in the second data structure, and that hashes and signatures are also used to specify locations within that data structure. When hashes are used, it is possible for more than one input into the hash function to return the same hash value. This means that a unit sharing the same signature as a different unit may be promoted to the SSD instead of the proper unit. However, the likelihood of that occurrence is small. Accordingly, though the hash table may not be always correct with respect to the number of access a unit on the HDD has received, the data structure is correct most of the time, and is space efficient in that it can store a large volume of information relative to the amount of memory consumed.

The method shown in FIG. 6 can be implemented in operation 509 of FIG. 5. In operation 601, the system calculates a set of hash values for the unit number in the HDD that is being accessed by either a read request or a write request. The set of hash values can be derived from a set of different hash functions. For example, in one embodiment, three different hash functions, h1, h2, and h3 can be used, though any number of hash functions greater than or equal to one can be used. In addition, operation 601 calculates a signature of X which can be represented as S(X) where S represents a signature of the value of X. The signature can be derived from a cryptographic algorithm or from other algorithms, which attempt to create a relatively unique value for a given input but are not guaranteed to create a unique value for each possible value of X. This lack of global uniqueness contributes to the probabilistic nature of the hash table. After the values are calculated in operation 601, the system proceeds to operation 603 in which it determines whether any of the locations specified by the hash values are empty in the second data structure. In other words, each of those locations specified by the hash values is examined in the ghost table, in one embodiment, to determine whether or not they are empty. If any one of them is empty, then operation 605 follows in which the signature, such as S(X) of the HDD's unit number is stored in one of those empty locations specified by one of the hash values. On the other hand, if operation 603 determines that none of those locations are empty, then operation 607 is performed in which a random location in the second data structure is randomly selected in operation 607 and in operation 609 the signature is stored in the selected random location. The use of a random location can cause the overwriting of a prior signature stored in that location.

FIG. 7 shows an example of a method for either finding or removing data from the data structure. When the method of FIG. 7 is used for finding, operation 707 is not performed. The method shown in FIG. 7 for finding can be performed in operation 507 of FIG. 5. When the method shown in FIG. 7 is used for removing data from the ghost table, then operation 707 is performed, and this method is used as part of operation 515 shown in FIG. 5. The method of FIG. 7 can begin in operation 701 in which a set of hash values is calculated for X. This set of hash values should correspond to the same set of hash values with the same set of hash functions that was previously used in operation 601. Similarly, a signature is calculated for the value of X, which is a similar signature to the signature, which was calculated in operation 601. Then in operation 703, the system looks for the signature value in the locations of the ghost table, which are specified by the set of hash values calculated in operation 701. If the signature is found in operation 705, then the signature of the unit number is removed from the second data structure in operation 707 as shown in FIG. 7. In one embodiment, the size of the data structure can be doubled or halved based on the performance of the data structure and the amount of memory available.

Figure 8:
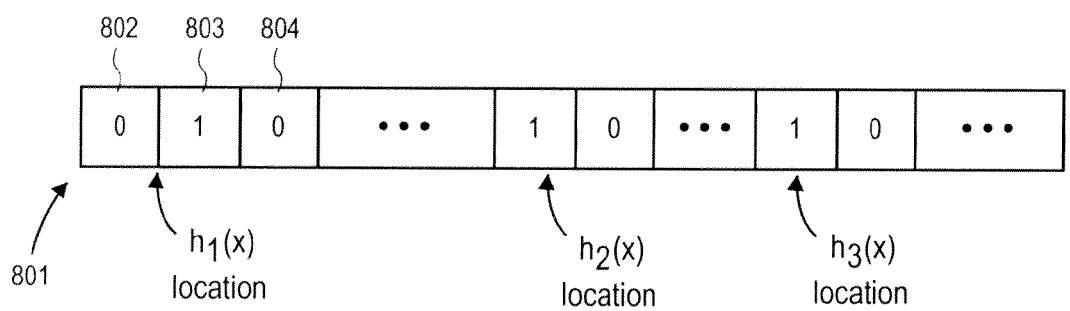
FIG. 8 shows an example of a Bloom filter data structure, which may be used with at least one embodiment of the present invention.

An alternative embodiment of the present invention can employ a Bloom filter rather than the probabilistic hash table, which can be implemented as a ghost table. An example of a Bloom filter is shown in FIG. 8. A Bloom filter is a probabilistic data structure that can be used to test whether a unit on the second storage device has probably been recently accessed. The Bloom filter is probabilistic because it is possible that a false positive result is returned, meaning a unit is determined to be within the data structure when it actually is not. However, false negatives are not possible, so a query of the second data structure will return a result that the unit probably has been recently accessed, or that the unit definitely has not been recently accessed. The Bloom filter can have multiple locations corresponding to each unit of the SSD or a proportional number of the units of the SSD. Each location stores either a one or a zero in one embodiment which indicates the status of the number of accesses of a particular unit on the HDD. Hash values of the unit numbers of the HDD are used as an address to access a particular location in the Bloom filter. As shown in FIG. 8, the Bloom filter 801 includes locations 802, 803, and 804. Location 803 is specified by a hash function h1 of X, which specifies that location. The value one has been set in location 803 and has also been set in two other locations specified by two other addresses h2 of X and h3 of X. The Bloom filter shown in FIG. 8 can be used with the method of FIG. 5 by replacing the ghost table with the Bloom filter in operation 507 and by replacing the ghost table with the Bloom filter in operation 509. However, the unit number, in operation 515 is not removed from the Bloom filter when a Bloom filter is used in place of the ghost table because it is not possible to remove a unit from a Bloom filter and ensure that the Bloom filter will not produce false negative results. Accordingly, in one embodiment, as a Bloom filter in the second data structure fills, an additional Bloom filter may be added in a circular queue.

Figure 9:
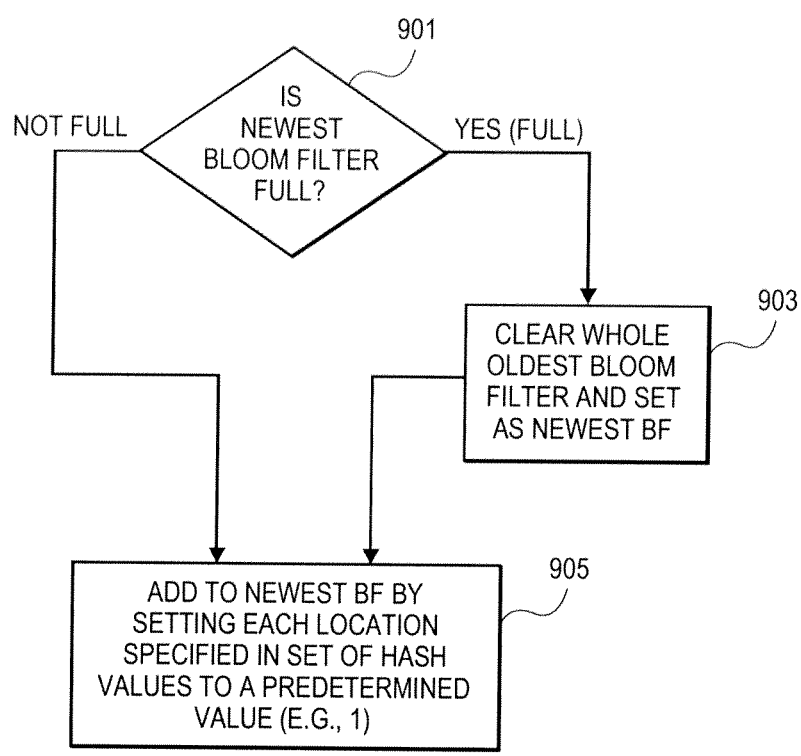
FIG. 9 is a flowchart, which shows a method according to one embodiment of the present invention.

FIG. 9 shows an example of a method for adding a unit in the HDD to the Bloom filter. The operations shown in FIG. 9 are performed in operation 509 when the Bloom filter is used in place of the ghost table. In one embodiment, a circular queue of Bloom filters can be used such that there are multiple Bloom filters maintained in the circular queue where the newest Bloom filter is used to store values and the older Bloom filters circulate through the circular queue as will be apparent from FIG. 9. When operation 509 begins, in the case of a Bloom filter implementation of FIG. 5, operation 901 determines whether the newest Bloom filter is full. If it is not, operation 905 follows in which data representing a currently accessed unit on the HDD is added to the newest Bloom filter by setting each location specified in a set of hash values to a predetermined value, such as one. In one embodiment, a set of hash values is calculated as in operation 1001 and each of those hash values specifies a particular location or address within the Bloom filter and a value of one is written into each of those addresses or locations specified in the set of hash values.

Figure 10:
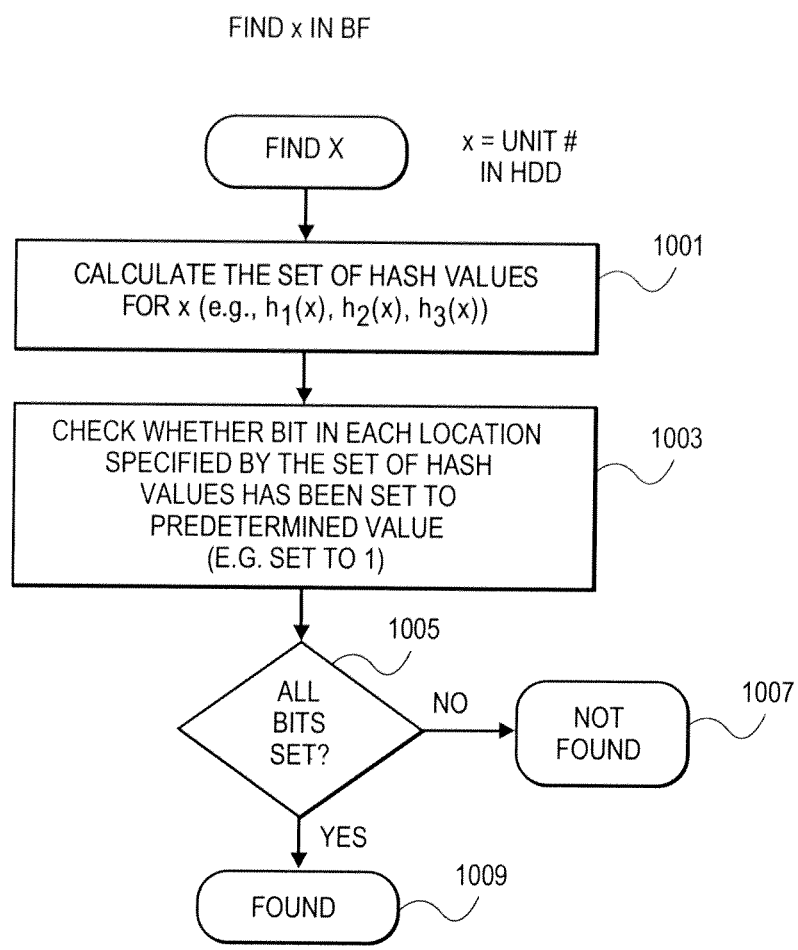
FIG. 10 is a flowchart, which shows a method according to one embodiment of the present invention.

FIG. 10 depicts a method for finding whether a particular unit number in the HDD is in the second data structure, which in this case is the Bloom filter. FIG. 10 can be performed as part of operation 507 when the method of FIG. 5 uses a Bloom filter instead of a ghost table. In operation 1001, the system calculates a set of hash values for the unit number in the HDD. In one embodiment, three different hash functions can be used to calculate three hash values. Then, in operation 1003, the system checks whether a bit, in each location specified by the set of hash values, has been set to a predetermined value, such as the value of one, in at least one of the Bloom filters in the queue. In operation 1005, it is determined whether all the bits have been set to one in each of the locations specified by the hash values in the set of hash values. If at least one of the locations in each Bloom filter in the queue has not been set, then the system concludes that the unit has not been found and proceeds to operation 1007, which causes operation 509 to follow in FIG. 5. If on the other hand the system determines all bits have been set in the proper locations determined by the set of hash values, then processing proceeds to operation 1009 which causes operation 511 to following in FIG. 5. As with the Ghost Table in FIG. 4, embodiments of the invention can increase or decrease the size of the second data structure as needed. As Bloom filters in the circular queue fill, additional Bloom filters can be added to the circular queue. After the size of the circular queue of Bloom filters exceeds a defined value, the oldest Bloom filter can be removed from the list.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A non-transitory machine-readable storage medium having instructions stored therein, which when executed by a machine, cause a machine to perform operations for managing data on a multi-device composite data storage system, the operations comprising:

initializing a first data structure, the first data structure to indicate a set of counts of recent accesses to one or more storage units in a set of storage units on a first non-volatile data storage device, the first data structure is managed via an algorithm that uses a circular queue and a pointer, wherein a count of recent accesses to a first storage unit in the set of storage units is incremented upon access to a logical block within the first storage unit, and wherein when a count of recent accesses to a second storage unit is decremented to a predetermined value, the predetermined value indicates that the second storage unit is eligible for migration to a second non-volatile data storage device;

initializing a second data structure, the second data structure to probabilistically indicate that a storage unit on the second non-volatile data storage device has been recently referenced, wherein the second data structure comprises a queue of one or more Bloom filters and each storage unit includes multiple logical blocks;

receiving a request to access a logical block of the multi-device composite data storage system which includes the first and the second non-volatile data storage devices;

accessing a requested logical block from the first non-volatile data storage device if the requested logical block is stored on the first non-volatile data storage device, and updating the first data structure to indicate that the requested logical block of the multi-device composite data storage system was recently accessed from the first non-volatile data storage device;

searching the second data structure for the requested logical block if the requested logical block is not found on the first non-volatile data storage device;

adding an identifier for the requested logical block to the second data structure if the requested logical block is not found in the second data structure; and migrating the requested logical block from the second non-volatile data storage device to the first non-volatile data storage device if the requested logical block is found in the second data structure, wherein migrating the storage unit includes migrating multiple logical blocks in response to the request to access the requested logical block.

2. The non-transitory machine-readable storage medium of claim 1 further comprising:

before migrating the requested logical block from the second non-volatile data storage device to the first non-volatile data storage device, calculating a set of hash values for an identifier of the storage unit on the second non-volatile data storage device; and setting in the second data structure, at each index defined by a hash in the set of hash values, a value that indicates the storage unit has been referenced.

3. The non-transitory machine-readable storage medium of claim 2 wherein calculating the set of hash values uses a plurality of hash functions.

4. The non-transitory machine-readable storage medium of claim 3 further comprising resetting a Bloom filter in the second data structure.

5. The non-transitory machine-readable storage medium of claim 3 further comprising adding an additional Bloom filter to the second data structure.

6. The non-transitory machine-readable storage medium of claim 5 further comprising removing a Bloom filter from the second data structure.

7. A composite non-volatile data storage device comprising:

a first data storage device including a first set of storage units;

a second data storage device coupled to the first data storage device, the second data storage device including a second set of storage units, wherein each storage unit in the first and second set of storage units includes multiple logical blocks;

a first data structure maintained by an algorithm that uses a circular queue and a pointer to track a set of counts of recent accesses to each storage unit in the first set of storage units, wherein a count of recent accesses to a first storage unit in the first set of storage units is incremented upon access to a logical block within the first storage unit and when a count of recent accesses to a second storage unit in the first set of storage units is decremented to a predetermined value, the predetermined value indicates that the second storage unit in the first set of storage units is eligible for migration to the second data storage device;

a second data structure to include a queue of one or more Bloom filters to probabilistically indicate whether a logical block in the second set of storage units has been recently referenced;

control logic to receive a first request to access a logical block and, in response to the first request, access a requested logical block from a storage unit in the second set of storage units, calculate a set of hash values for an identifier of the storage unit in the second set of storage units, and set in the second data structure, at each index defined by the set of hash values, a value that indicates the storage unit in the second set of storage units has been accessed;

wherein upon a second request to access the requested logical block from the storage unit in the second set of storage units, the control logic is to search the second data structure at each index defined by the set of hash values for the value that indicates that the storage unit in the second set of storage units has been recently accessed, the storage unit in the second set of storage units containing the requested logical block; and wherein the control logic is further to migrate the multiple logical blocks within the storage unit in the second set of storage units containing the requested logical block from the second data storage device to the first data storage device in response to the second request to access the requested logical block.

8. The composite non-volatile data storage device of claim 7, wherein the first and second data storage devices of the composite non-volatile data storage device are addressed by a file system as a single volume.

9. The composite non-volatile data storage device as in claim 8, wherein the control logic further to:

receive a request to access a logical block on the composite non-volatile data storage device, wherein the requested logical block is mapped to the first data storage device;

access the requested logical block from the first set of storage units on the first data storage device; and update the first data structure to indicate a recent access for an accessed storage unit in the first set of storage units on the first data storage device.

10. The composite non-volatile data storage device of claim 7, wherein the control logic further to calculate a plurality of hash values using a plurality of hash functions for the set of hash values for the identifier of the storage unit.

11. The composite non-volatile data storage device of claim 7, wherein the control logic is to migrate the multiple logical blocks within the storage unit in the second set of storage units containing the requested logical block when each index searched contains the value that indicates that the storage unit containing the requested logical block has been recently referenced.

12. The composite non-volatile data storage device of claim 7, wherein the first data storage device comprises a solid-state device.

13. The composite non-volatile data storage device of claim 7, wherein the second data storage device comprises a hard disk drive.

14. The composite non-volatile data storage device of claim 7, wherein the algorithm is to decrement the count of recent accesses to the second storage unit to determine a candidate to migrate from the first data storage device, wherein to determine the candidate to migrate from the first data storage device, the algorithm is to:

select, via the pointer, the count of recent accesses to the second storage unit, the count of recent accesses stored in the circular queue;

decrement the count of recent accesses to the second storage unit; and determine if the count of recent accesses to the second storage unit has been decremented to the predetermined value that indicates that the second storage unit is eligible for migration to the second data storage device.

15. The composite non-volatile data storage device of claim 14, the control logic further to migrate data in the second storage unit to the second data storage device in response to a determination that the second storage unit is a candidate to migrate from the first data storage device.

16. The non-transitory machine-readable storage medium of claim 1, the operations additionally comprising accessing the requested logical block from the second non-volatile data storage device if the logical block is not contained on the first non-volatile data storage device.

17. The non-transitory machine-readable storage medium of claim 1, the operations additionally comprising:
selecting the count of recent accesses to the second storage unit, wherein the count of recent accesses is stored in the circular queue;
decrementing the count of recent accesses to the second storage unit;
determining if the count of recent accesses has been decremented to the predetermined value that indicates that the second storage unit is eligible for migration to a second non-volatile data storage device.

18. The non-transitory machine-readable storage medium of claim 17, the operations additionally comprising migrating data in the second storage unit to the second non-volatile data storage device in response to determining that the second storage unit is a candidate to migrate from the first non-volatile data storage device.

19. The non-transitory machine-readable storage medium of claim 1, wherein the first non-volatile data storage device is a solid-state device.

20. The non-transitory machine-readable storage medium of claim 1, wherein the second non-volatile data storage device is a hard disk drive.

21. A method for managing data on a multi-device composite data storage system, which includes a first non-volatile data storage device and a second non-volatile data storage device, the method comprising:
initializing a first data structure, the first data structure to indicate a set of counts of recent accesses to one or more storage units in a set of storage units on the first non-volatile data storage device, the first data structure managed via an algorithm that uses a circular queue and a pointer, wherein a count of recent accesses to a first storage unit in the set of storage units on the first non-volatile data storage device is incremented upon access to a logical block within the first storage unit, and wherein when a count of recent accesses to a second storage unit in the set of storage units on the first non-volatile data storage device is decremented to a predetermined value, the predetermined value indicates that the second storage unit is eligible for migration to the second non-volatile data storage device;
initializing a second data structure, the second data structure to probabilistically indicate that a storage unit on the second non-volatile data storage device has been recently referenced, wherein the second data structure comprises a queue of one or more Bloom filters and each storage unit includes multiple logical blocks;
receiving a request to access a logical block of the multi-device composite data storage system which includes the first and the second non-volatile data storage devices;
accessing a requested logical block from the first non-volatile data storage device if the logical block is stored in the first non-volatile data storage device, and updating the first data structure to indicate that the requested logical block of the multi-device composite data storage system was recently accessed from the first non-volatile data storage device;
searching the second data structure for the requested logical block if the requested logical block is not found on the first non-volatile data storage device;
adding an identifier for the requested logical block to the second data structure if the requested logical block is not found in the second data structure; and
migrating the requested logical block from the second non-volatile data storage device to the first non-volatile data storage device if the requested logical block is found in the second data structure, wherein migrating the storage unit includes migrating multiple logical blocks in response to the request to access the requested logical block.

22. The method of claim 21 further comprising:
before migrating the requested logical block from the second non-volatile data storage device to the first non-volatile data storage device, calculating a set of hash values for an identifier of the storage unit on the second non-volatile data storage device; and
setting in the second data structure, at each index defined by a hash in the set of hash values, a value that indicates the storage unit has been referenced.

23. The method of claim 22 wherein calculating the set of hash values uses a plurality of hash functions.

24. The method of claim 23 further comprising resetting a Bloom filter in the second data structure.

25. The method of claim 23 further comprising adding an additional Bloom filter to the second data structure.

26. The method of claim 25 further comprising removing a Bloom filter from the second data structure.

27. The method of claim 21, additionally comprising accessing the requested logical block from the second non-volatile data storage device if the logical block is not contained on the first non-volatile data storage device.

28. The method of claim 21, additionally comprising:
selecting the count of recent accesses to the second storage unit, wherein the count of recent accesses is stored in the circular queue;
decrementing the count of recent accesses to the second storage unit;
determining if the count of recent accesses has been decremented to the predetermined value that indicates that the second storage unit is eligible for migration to a second non-volatile data storage device.

29. The method of claim 28, additionally comprising migrating data in the second storage unit to the second non-volatile data storage device in response to determining that the second storage unit is a candidate to migrate from the first non-volatile data storage device.

30. The method of claim 21, wherein the first non-volatile data storage device is a solid-state device.

31. The method of claim 21, wherein the second non-volatile data storage device is a hard disk drive.

* * * * *